United States Patent
Komaya et al.

(10) Patent No.: US 10,784,038 B2
(45) Date of Patent: Sep. 22, 2020

(54) COMMON MODE FILTER

(71) Applicant: TDK Corporation, Tokyo (JP)

(72) Inventors: Yuma Komaya, Tokyo (JP); Miki Kusakabe, Yamagata (JP); Tomokazu Tsuchiya, Tokyo (JP)

(73) Assignee: TDK CORPORATION, Tokyo (JP)

( * ) Notice: Subject to any disclaimer, the term of this patent is extended or adjusted under 35 U.S.C. 154(b) by 180 days.

(21) Appl. No.: 15/876,575

(22) Filed: Jan. 22, 2018

(65) Prior Publication Data

US 2018/0211764 A1 Jul. 26, 2018

(51) Int. Cl.
| | | |
|---|---|---|
| H01F 17/04 | (2006.01) | |
| H01F 27/28 | (2006.01) | |
| H02K 3/00 | (2006.01) | |
| H01F 27/00 | (2006.01) | |
| H01F 27/29 | (2006.01) | |
| H01F 17/00 | (2006.01) | |

(52) U.S. Cl.
CPC ......... *H01F 27/2823* (2013.01); *H01F 17/04* (2013.01); *H01F 17/045* (2013.01); *H01F 27/006* (2013.01); *H02K 3/00* (2013.01); *H01F 27/29* (2013.01); *H01F 2017/0093* (2013.01)

(58) Field of Classification Search
CPC ............................. H01F 17/045; H01F 17/04
See application file for complete search history.

(56) References Cited

U.S. PATENT DOCUMENTS

| | | | | |
|---|---|---|---|---|
| 4,227,143 A | * | 10/1980 | Elders ................ | H01F 27/2823 323/355 |
| 2014/0097928 A1 | * | 4/2014 | Tomonari ............... | H01F 27/28 336/207 |
| 2014/0167903 A1 | * | 6/2014 | Tomonari .............. | H01F 17/045 336/220 |
| 2017/0069418 A1 | * | 3/2017 | Yamakita .............. | H01F 41/069 |
| 2017/0169935 A1 | * | 6/2017 | Miyamoto .......... | H01F 27/2823 |
| 2018/0096782 A1 | * | 4/2018 | Miyamoto ............. | H01F 27/24 |

FOREIGN PATENT DOCUMENTS

JP 2014-199904 A 10/2014

* cited by examiner

*Primary Examiner* — Elvin G Enad
*Assistant Examiner* — Malcolm Barnes
(74) *Attorney, Agent, or Firm* — Young Law Firm, P.C.

(57) ABSTRACT

Disclosed herein is a common mode filter that includes a winding core part including first to third winding areas and first and second wires wound in a same direction around the winding core part and crossing each other in the third winding area. The first wire is aligned and wound in the first and second winding areas, and the second wire is aligned and wound on the first wire in the first and second winding areas, whereby a plurality of winding blocks are formed. The winding blocks include a first winding block positioned in the first winding area and second and third winding blocks positioned in the second winding area. The second wire constituting the second winding block and the second wire constituting the third winding block are separated from each other.

12 Claims, 10 Drawing Sheets

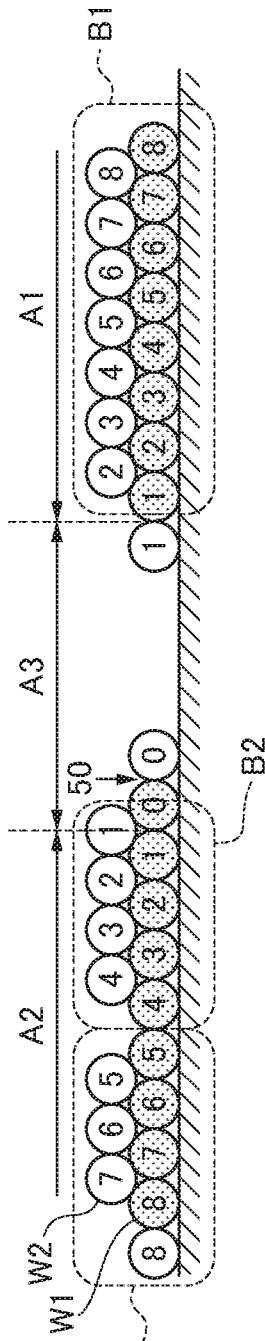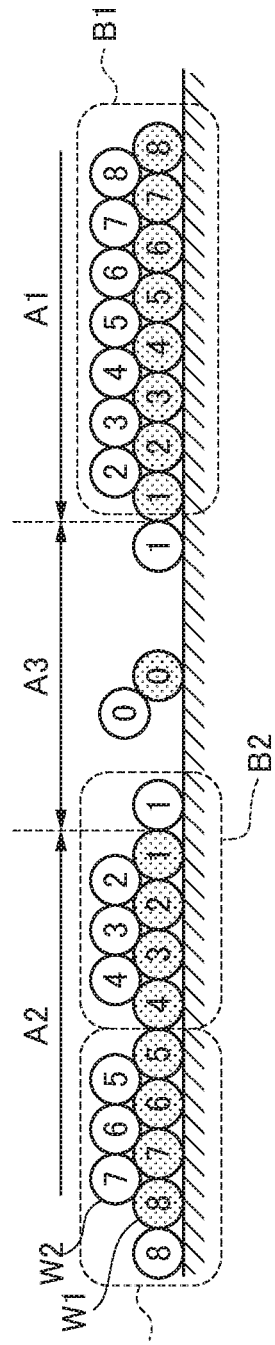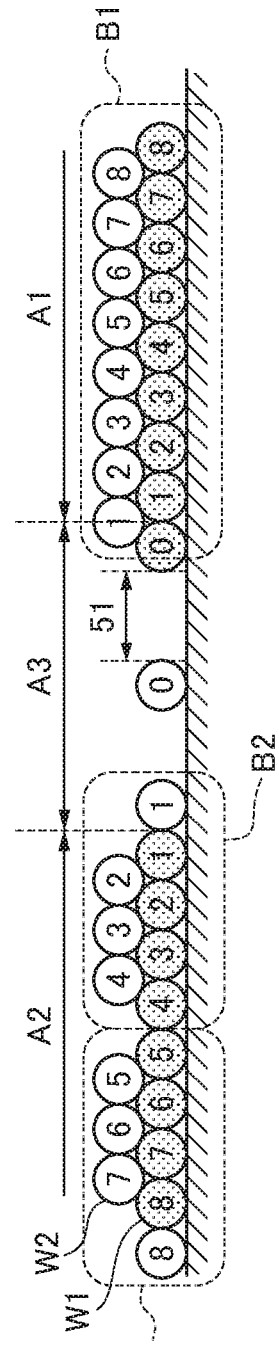

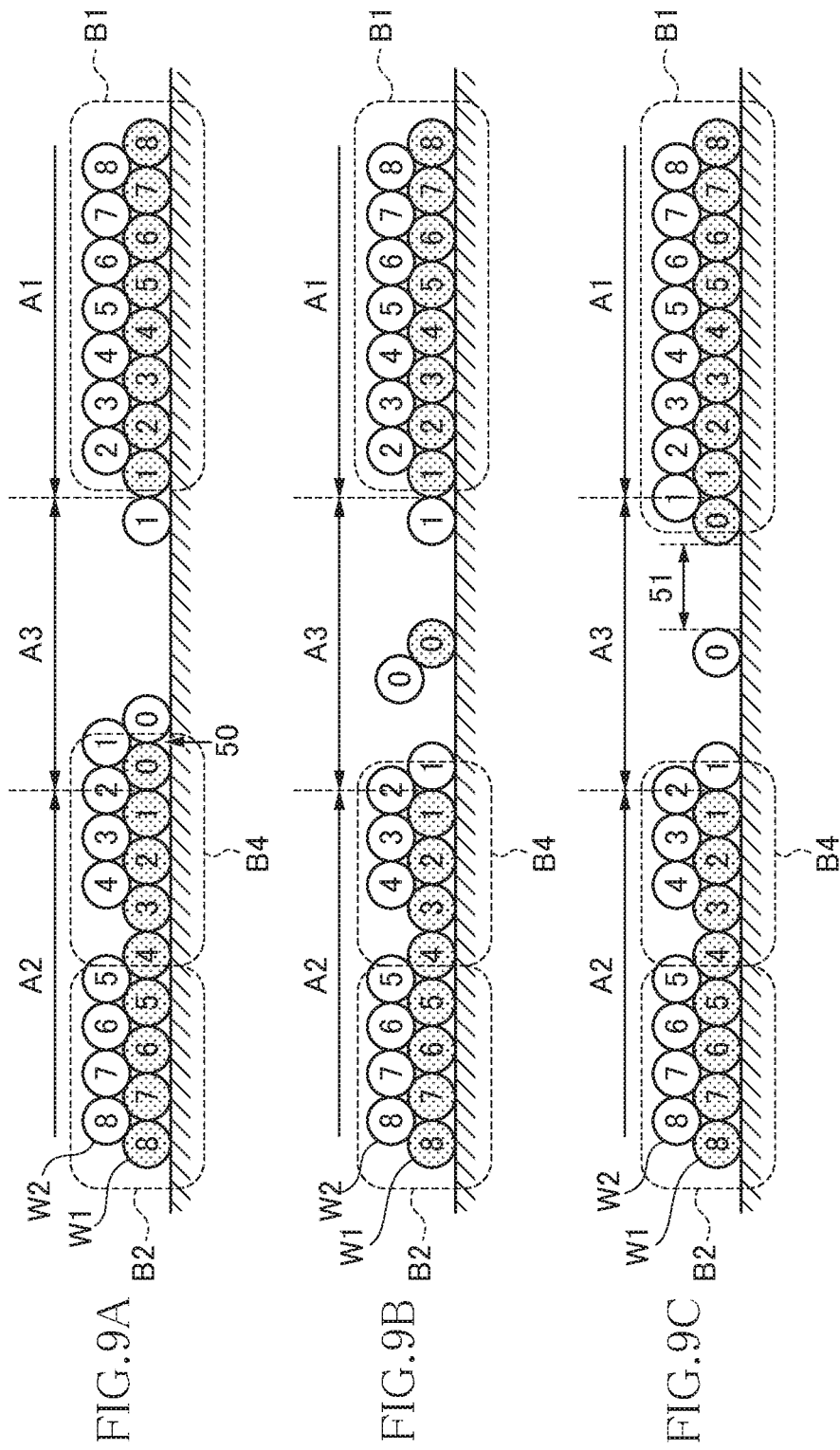

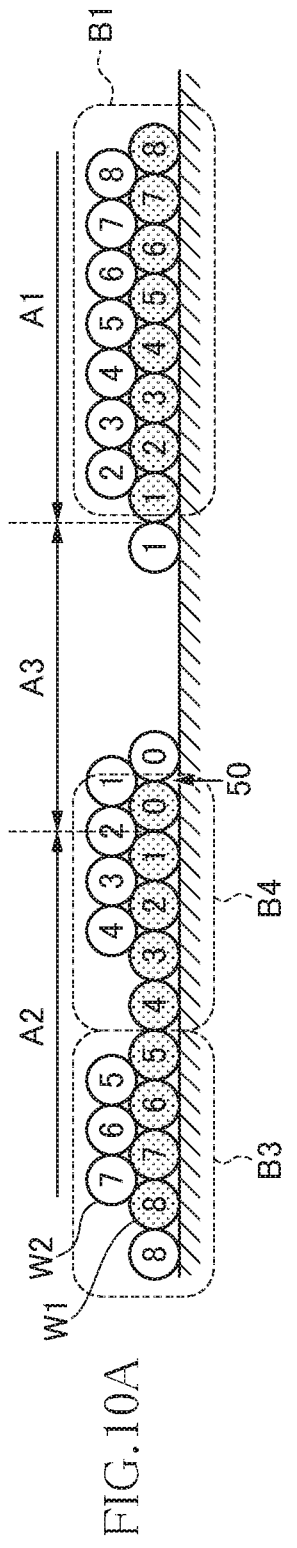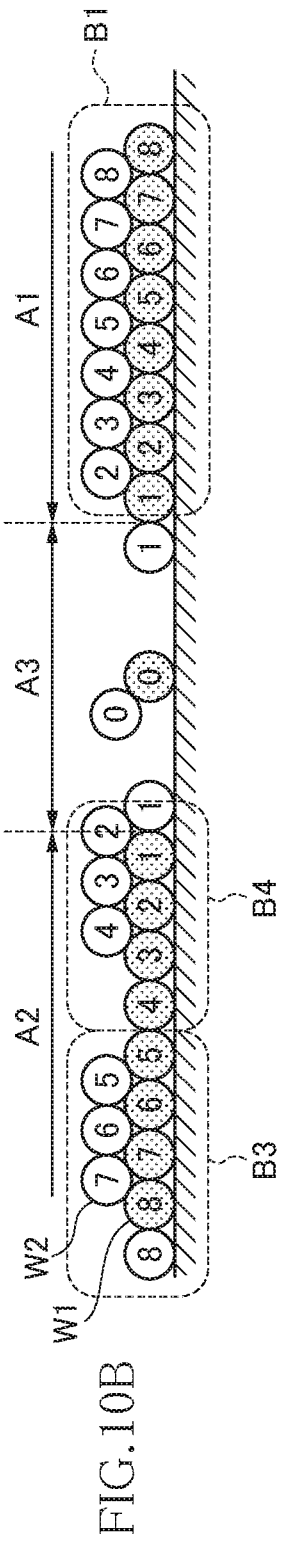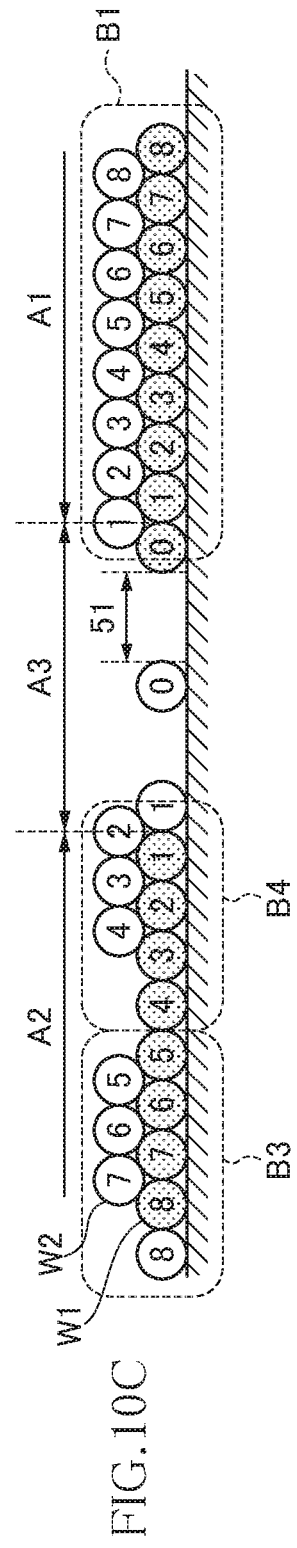

COMMON MODE FILTER

BACKGROUND OF THE INVENTION

Field of the Invention

The present invention relates to a common mode filter and, more particularly, to a common mode filter of a type in which a pair of wires cross each other on the way.

Description of Related Art

A common mode filter is widely used in many electronic devices, such as mobile electronic devices and on-vehicle LANs, as an element for removing common mode noise superimposed on differential signal lines. In recent years, a common mode filter using a surface-mountable drum core supersedes a common mode filter using a toroidal core (see JP 2014-199904A).

In the common mode filter described in JP 2014-199904A, a pair of wires are made to cross each other on the way to thereby enhance symmetry between differential signals in a high-frequency region.

The common mode filter described in JP 2014-199904 A has an excellent feature in that high-frequency characteristics do not change so much even when the mounting direction thereof with respect to a mounting substrate is rotated by 180°. However, this feature means that only a single characteristic can be obtained even when the mounting direction of the common mode filter with respect to amounting substrate is changed.

SUMMARY

It is therefore an object of the present invention to provide a common mode filter whose high-frequency characteristics change depending on the mounting direction thereof with respect to a mounting substrate.

A common mode filter according to the present invention includes a winding core part and first and second wires wound in the same direction around the winding core part. The winding core part includes a first winding area positioned at one end side in the axial direction, a second winding area positioned at the other end side in the axial direction, and a third winding area positioned between the first and second winding areas. The first and second wires cross each other in the third winding area, the first wire is aligned and wound in the first and second winding areas, and the second wire is aligned and wound on the first wire in the first and second winding areas, whereby a plurality of winding blocks in each of which the second wire is aligned and wound on the aligned and wound first wire are formed. The plurality of winding blocks include a first winding block positioned in the first winding area and second and third winding blocks positioned in the second winding area. The second wire constituting the second winding block and the second wire constituting the third winding block are separated from each other.

According to the present invention, the winding layout in the first winding area and the winding layout in the second winding area differ from each other, so that high-frequency characteristics change depending on the mounting direction with respect to amounting substrate. As a result, there can be provided a common mode filter having two types of characteristics. Further, the first and second wires cross each other in the third winding area, so that symmetry between differential signals can be enhanced.

In the present invention, it is preferable that the number of turns of the second wire constituting the first winding block is larger than the number of turns of the second wire constituting the second winding block and the number of turns of the second wire constituting the third winding block. With this configuration, a difference between the number of turns in the first winding area and the number of turns in the second winding area is reduced, so that it is possible to further enhance symmetry between differential signals.

In the present invention, it is preferable that the first winding block is a winding block in which the same turns of the first and second wires are mutually adjacent. With this configuration, symmetry between the first and second wires in the first winding block can be enhanced, allowing excellent high-frequency characteristics to be obtained.

In this case, a configuration may be adopted in which the same turns of the first and second wires are mutually adjacent in both the second and third winding blocks. Alternatively, a configuration may be adopted in which the same turns of the first and second wires are mutually adjacent in the second winding block, and the same turns of the first and second wires are positioned with different turns thereof interposed in the third winding block. In the former case, symmetry between the first and second wires can be enhanced in the second and third winding blocks as well, allowing excellent high-frequency characteristics to be obtained. Further, in the latter case, high-frequency characteristics can be changed significantly depending on the mounting direction with respect to a mounting substrate. The third winding block may be positioned between the first and second winding blocks.

In the present invention, it is preferable that the first and second wires are at least partially separated from each other in the third winding area. With this configuration, a crossing angle between the first and second wires in the third winding area can be increased. This reduces a contact distance between the two wires at the crossing point, thereby allowing increased stability in the winding position of the upper-side second wire to be obtained.

In the present invention, it is preferable that the third winding area has first and second edges extending in the axial direction and a surface area sandwiched between the first and second edges, that the first wire includes a first section positioned on the surface area, that the second wire includes a second section positioned on the surface area, and that the first section of the first wire and the second section of the second wire cross each other on the surface area and are separated from each other at least on one of the first and second edges. With the above configuration, the first and second wires are held by the first or second edge at a part where they are separated from each other, allowing increased stability in the winding position of the wire to be obtained.

In this case, it is preferable that the first section of the first wire and the second section of the second wire are separated from each other on the first edge and contact each other on the second edge. This configuration is particularly effective when the second wire is wound from the first edge side toward the second edge side.

As described above, according to the present invention, there can be provided a common mode filter whose high-frequency characteristics change depending on the mounting direction thereof with respect to a mounting substrate.

BRIEF DESCRIPTION OF THE DRAWINGS

The above and other objects, features and advantages of this invention will become more apparent by reference to the following detailed description of the invention taken in conjunction with the accompanying drawings, wherein:

FIG. 8A is a schematic cross-sectional view taken along line A-A (second edge E2) shown in FIG. 7;

FIG. 8B is a schematic cross-sectional view taken along line B-B shown in FIG. 7;

FIG. 8C is a schematic cross-sectional view taken along line C-C (first edge E1) shown in FIG. 7;

FIGS. 9A to 9C are views for explaining a first modification; and

FIGS. 10A to 10C are views for explaining a second modification.

DETAILED DESCRIPTION OF THE EMBODIMENTS

Preferred embodiments of the present invention will now be explained in detail with reference to the drawings.

First Embodiment

Figure 1:
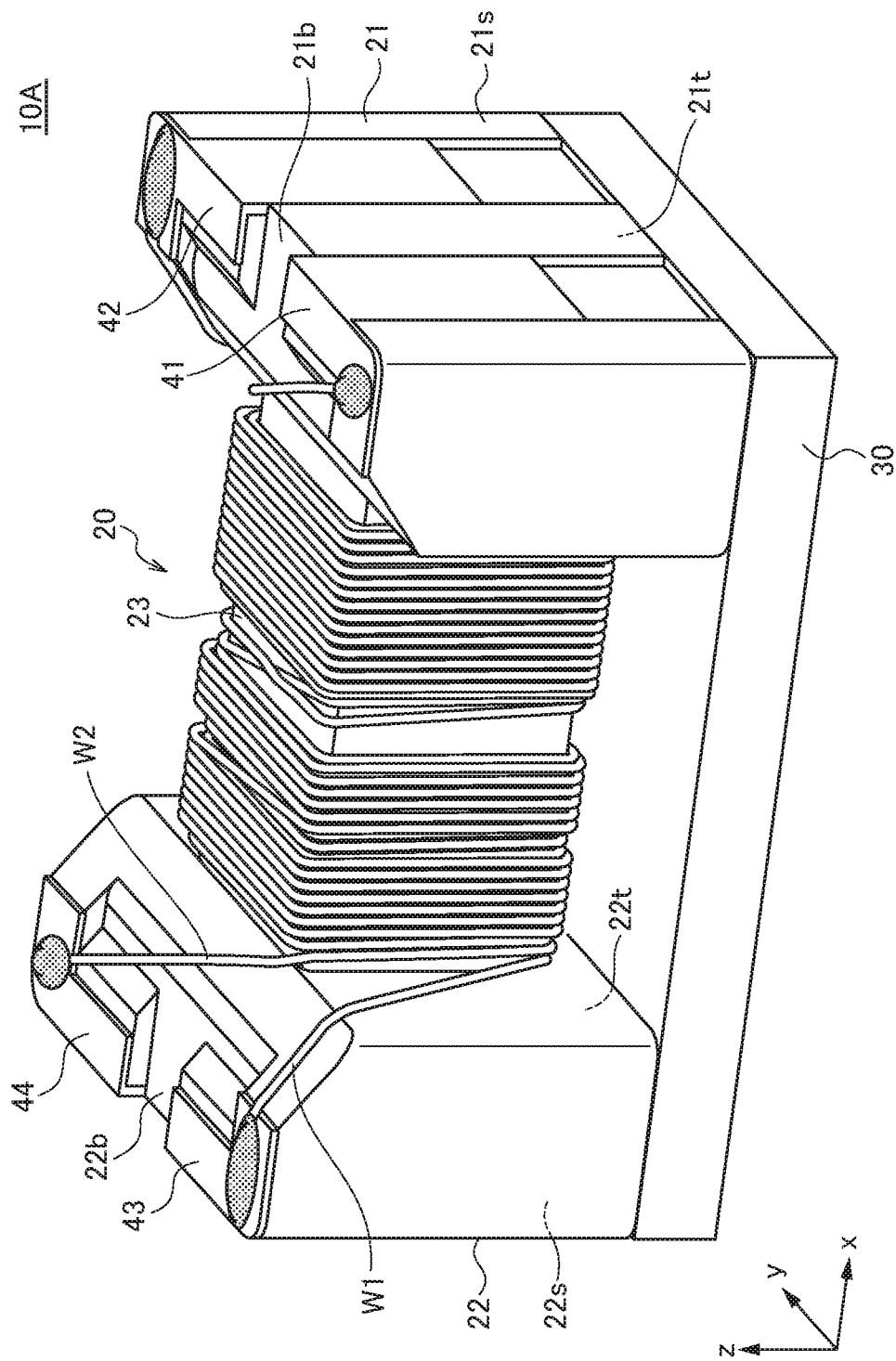
FIG. 1 is a schematic perspective view illustrating the outer appearance of a common mode filter according to a first embodiment of the present invention.

FIG. 1 is a schematic perspective view illustrating the outer appearance of a common mode filter 10A according to the first embodiment of the present invention.

As illustrated in FIG. 1, the common mode filter 10A according to the present embodiment has a drum-shaped core 20, a plate-like core 30, first to fourth terminal electrodes 41 to 44, and first and second wires W1 and W2. The drum-shaped core 20 and the plate-like core 30 are each formed of a magnetic material having a comparatively high permeability, such as an Ni—Zn based ferrite. The first to fourth terminal electrodes 41 to 44 are each a metal fitting formed of a good conductor material such as copper.

The drum-shaped core 20 has a first flange part 21, a second flange part 22, and a winding core part 23 disposed between the first and second flange parts 21 and 22. The winding core part 23 has its axis direction in the x-direction. The first and second flange parts 21 and 22 are disposed at the axially both ends of the winding core part 23 and integrally formed with the winding core part 23. The plate-like core 30 is bonded to top surfaces 21t and 22t of the respective flange parts 21 and 22. The top surfaces 21t and 22t of the respective flange parts 21 and 22 each constitute the xy plane, and the surfaces opposite to the top surfaces 21t and 22t are used as mounting surfaces 21b and 22b. The first and second terminal electrodes 41 and 42 are mounted on the mounting surface 21b and an outer surface 21s of the first flange part 21, and the third and second terminal electrodes 43 and 44 are mounted on the mounting surface 22b and an outer surface 22s of the second flange part 22. The outer surfaces 21s and 22s each constitute the yz surface. Fixing of the first to fourth terminal electrodes 41 to 44 is made by using an adhesive or the like.

The first and second wires W1 and W2 are wound around the winding core part 23 in the same direction. One and the other ends of the first wire W1 are connected respectively to the first and third terminal electrodes 41 and 43, and one and the other ends of the second wire W2 are connected respectively to the second and fourth terminal electrodes 42 and 44. The numbers of turns of the first and second wires W1 and W2 are the same.

Figure 2:
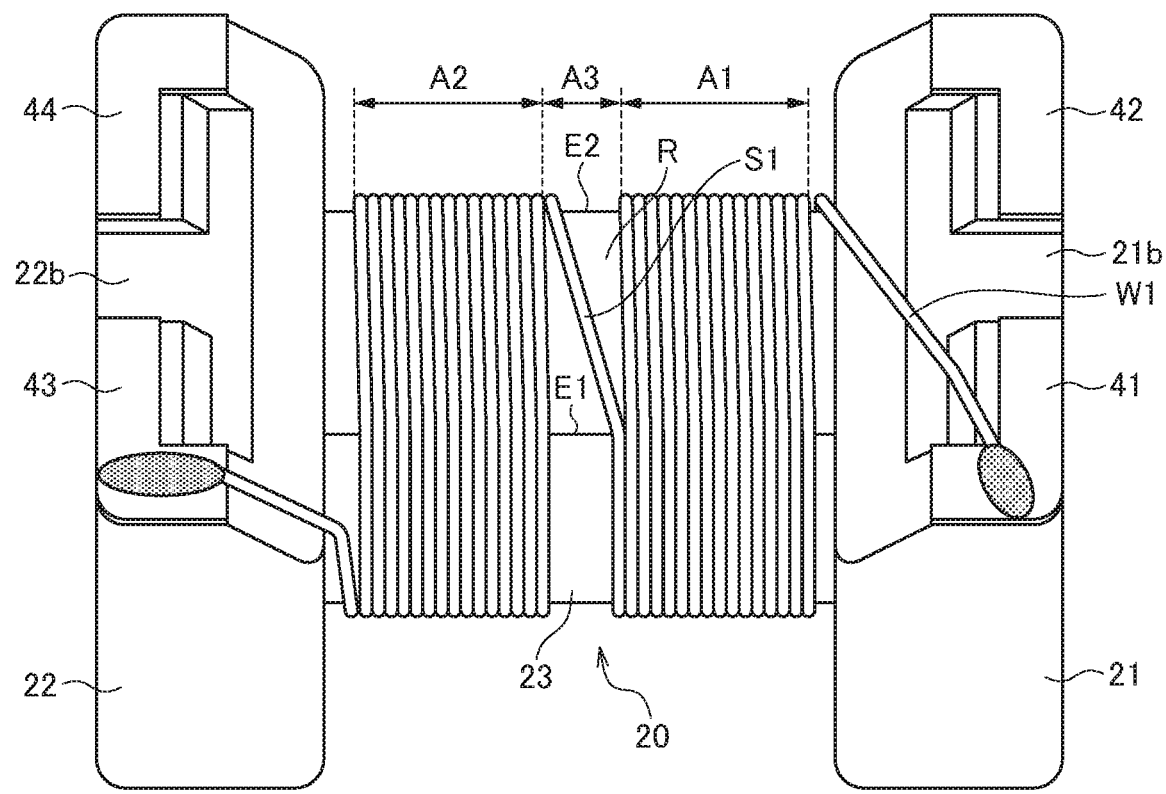
FIG. 2 is a view for explaining the winding layout of a first wire.

FIG. 2 is a view for explaining the winding layout of the first wire W1.

As illustrated in FIG. 2, the winding core part 23 of the drum-shaped core 20 includes a first winding area A1 positioned on the first flange part 21 side, a second winding area A2 positioned on the second flange part 22 side, and a third winding area A3 positioned between the first and second winding areas A1 and A2. The first wire W1 is aligned and wound in the first and second winding areas A1 and A2. Thus, the winding pitch of the first wire W1 in the first and second winding areas A1 and A2 is nearly equal to the diameter of the first wire W1 and, ideally, adjacent turns of the first wire W1 contact each other. Although not particularly limited, the number of turns of the first wire W1 in the first winding area A1 and the number of turns of the first wire W1 in the second winding area A2 are preferably the same.

In the third winding area A3, the amount of shift of the first wire W1 in the axial direction (x-direction) is large, so that an angle formed by the extending direction of the first wire W1 and the y-direction is larger in the third winding area W3 than that in the first and second winding areas A1 and A2. In the present embodiment, the first wire is significantly shifted on a surface area R of the third winding area A3. The surface area R refers to a surface belonging to the third winding area A3 and sandwiched between first and second edges E1 and E2 of the winding core part 23. In the present embodiment, the surface area R constitutes the xy plane. The first and second edges E1 and E2 are each a corner part extending in the x-direction. As illustrated in FIG. 2, a part of the first wire W1 positioned on the surface area R constitutes a first section S1. Although not particularly limited, the surface area R preferably faces in the same direction as that the mounting surfaces 21b and 22b face.

Figure 3:
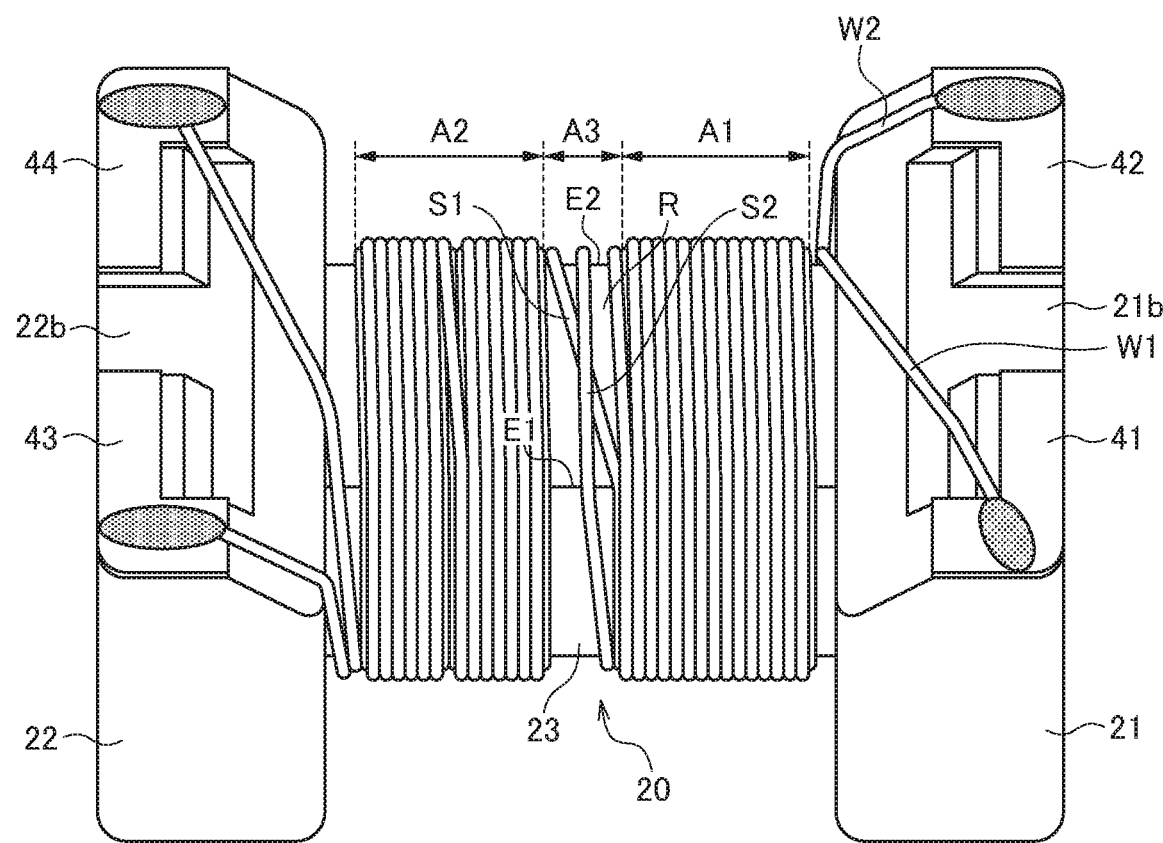
FIG. 3 is a view for explaining the winding layout of a second wire.

FIG. 3 is a view for explaining the winding layout of the second wire W2.

As illustrated in FIG. 3, the second wire W2 is wound on the first wire W1 in the first and second winding areas A1 and A2. Preferably, the second wire W2 is wound along the valley lines each formed by adjacent turns of the first wire W1. Thus, the winding pitch of the second wire W2 in the first and second winding areas A1 and A2 is nearly equal to the diameter of the second wire W2 and, ideally, adjacent turns of the second wire W2 contact each other. Although not particularly limited, the number of turns of the second wire W2 in the first winding area A1 and the number of turns of the second wire W2 in the second winding area A2 are preferably the same.

In the third winding area W3, the second wire W2 crosses the first wire W1 so as to straddle the same. More specifically, assuming that a part of the second wire W2 positioned on the surface area R is a second section S2, the first section S1 and the second section S2 cross each other on the surface area R. However, an angle formed by the extending direction of the second section S2 and the y-direction is smaller than an angle formed by the extending direction of the first section S1 and the y-direction.

Figure 4:
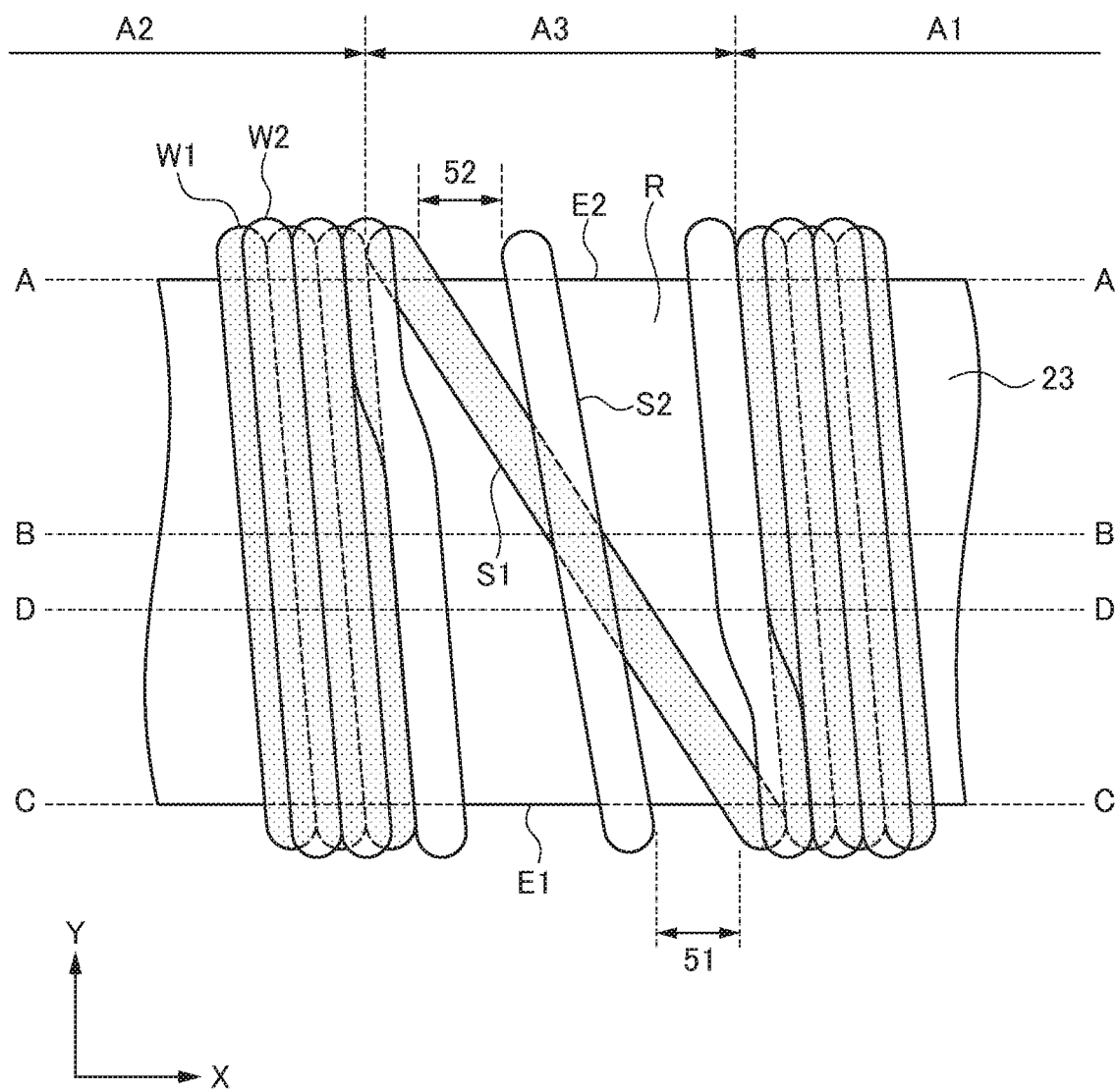
FIG. 4 is a schematic view for explaining more in detail the winding layouts of the first and second wires in the first embodiment.
Figure 5A:
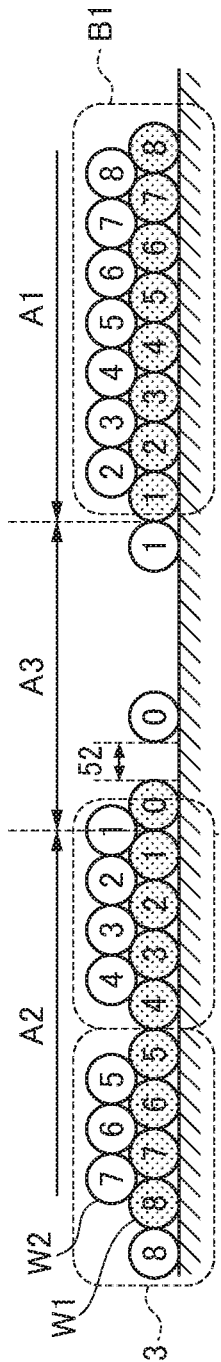
FIG. 5A is a schematic cross-sectional view taken along line A-A (second edge E2) shown in FIG. 4.
Figure 5B:
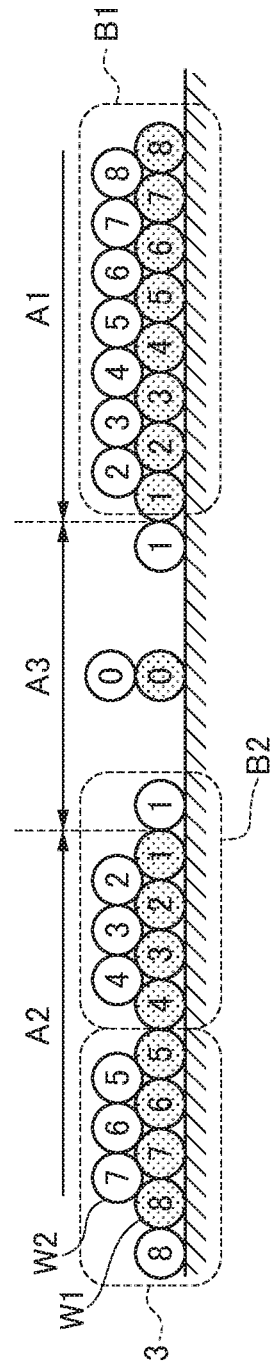
FIG. 5B is a schematic cross-sectional view taken along line B-B shown in FIG. 4.
Figure 5C:
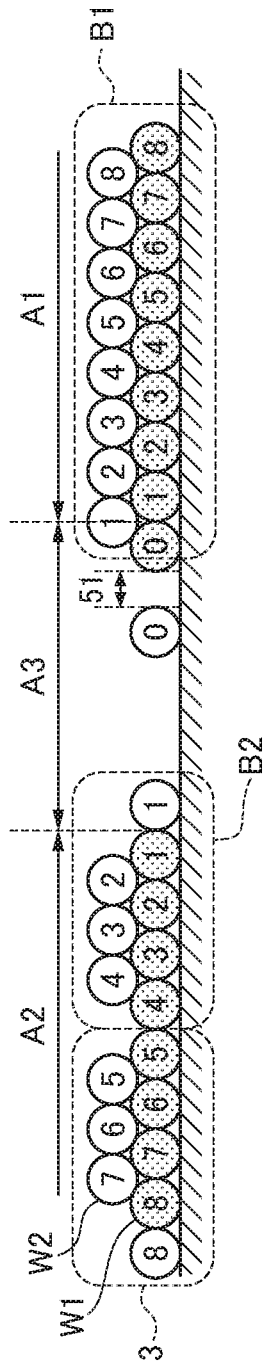
FIG. 5C is a schematic cross-sectional view taken along line C-C (first edge E1) shown in FIG. 4.
Figure 5D:
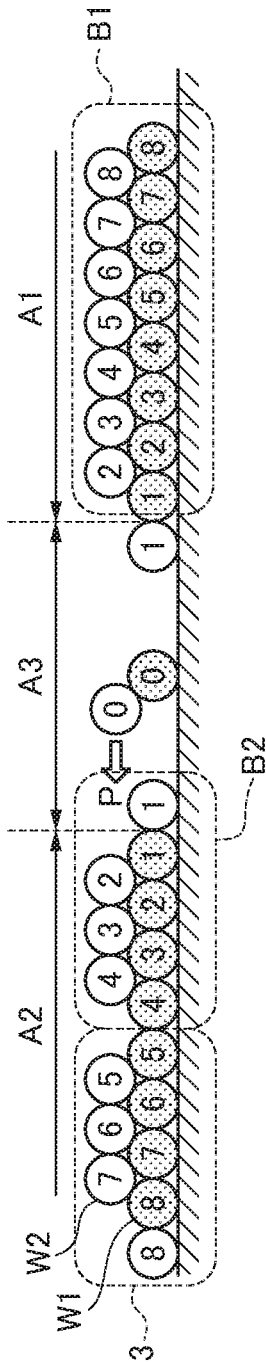
FIG. 5D is a schematic cross-sectional view taken along line D-D shown in FIG. 4.

FIG. 4 is a schematic view for explaining more in detail the winding layouts of the first and second wires W1 and W2. FIG. 5A is a schematic cross-sectional view taken along line A-A (second edge E2) shown in FIG. 4, FIG. 5B is a schematic cross-sectional view taken along line B-B shown in FIG. 4, FIG. 5C is a schematic cross-sectional view taken along line C-C (first edge E1) shown in FIG. 4, and FIG. 5D is a schematic cross-sectional view taken along line D-D shown in FIG. 4.

As illustrated in FIGS. 5A to 5D, in the present embodiment, the first and second wires W1 and W2 wound around the first winding area A1 constitute a first winding block B1, and the first and second wires W1 and W2 wound around the second winding area A2 constitute second and third winding blocks B2 and B3. In the present embodiment, the second winding block B2 is disposed between the first and third winding blocks B1 and B3.

The blocks B1 to B3 each have a structure in which the second wire W2 is aligned and wound on the aligned and wound first wire W1. In FIGS. 5A to 5D, numbers are added to the respective turns of the first and second wires W1 and W2. In FIGS. 5A to 5D, the turn number around the portion at which the first and second wires W1 and W2 cross each other is defined as "0". However, the number of turns of each of the first and second wires W1 and W2 is merely illustrative and may be larger than that illustrated there.

The first winding block B1 is a winding block in which wires with the same turn numbers counted from the crossing point are mutually adjacent. In the first winding block B1, the second wire W2 of the pair of wires (first and second wires W1 and W2) constituting the same turn is positioned on the crossing side (third winding area A3 side). In the example illustrated in FIGS. 5A to 5D, the number of turns of each of the first and second wires W1 and W2 is 8.

Similarly, the second winding block B2 is a winding block in which wires with the same turn numbers counted from the crossing point are mutually adjacent. In the second winding block B2, the second wire W2 of the pair of wires (first and second wires W1 and W2) constituting the same turn is positioned on the crossing side (third winding area A3 side). In the example illustrated in FIGS. 5A to 5D, the number of turns of each of the first and second wires W1 and W2 is 4.

Similarly, the third winding block B3 is a winding block in which wires with the same turn numbers counted from the crossing point are mutually adjacent. In the third winding block B3, the first wire W1 of the pair of wires (first and second wires W1 and W2) constituting the same turn is positioned on the crossing side (third winding area A3 side). In the example illustrated in FIGS. 5A to 5D, the number of turns of each of the first and second wires W1 and W2 is 4.

To realize the above winding layouts, the second wire W2 is wound with one pitch skipped on the way from the second winding block B2 to the third winding block B3 during winding work. As a result, a space corresponding to one pitch is formed between the second wire W2 (turn "4") constituting the second winding block B2 and the second wire W2 (turn "5") constituting the third winding block B3, and the position of the first wire W1 and the position of the second wire W2 can be interchanged with the space as a boundary. As described above, although the second and third winding blocks B2 and B3 each have a winding layout in which the same turns thereof are mutually adjacent, they have different characteristics since the wire positions are interchanged by providing the above-mentioned space corresponding to one pitch.

The positions of the first and second wires W1 and W2 are interchanged in the third winding area A3 as well. This is because the first and second wires W1 and W2 cross each other in the third winding area A3. Thus, in the common mode filter 10A according to the present embodiment, the position interchange occurs in two locations.

When the wires with the same turns counted from the crossing point are made to be mutually adjacent, symmetry between the first and second wires W1 and W2 with respect to the crossing point is enhanced. In the present embodiment, the same turns are mutually adjacent in any of the first to third winding blocks B1 to B3, so that excellent high-frequency characteristics can be obtained.

Further, although the number of turns (8 turns) in the first winding area A1 and the number of turns (4 turns+4 turns) in the second winding area A2 are equal to each other, the winding layouts differ between the first and second winding areas A1 and A2, so that when the common mode filter 10A according to the present embodiment is mounted on a mounting substrate, high-frequency characteristics changing depending on the mounting direction can be obtained. That is, depending on which one of the first winding area A1 side or second winding area A2 side is set as the input side of a differential signal, high-frequency characteristics to be obtained can be varied. As a result, two types of characteristics can be imparted to one common mode filter.

Returning to FIG. 4, the angle formed by the extending direction of the second section S2 and the y-direction is sufficiently smaller than the angle formed by the extending direction of the first section S1 and the y-direction, with the result that the first and second wires W1 and W2 are separated from each other near the crossing point. In the present embodiment, the first and second wires W1 and W2 are separated from each other on the first and second edges E1 and E2 as denoted by double headed arrows 51 and 52, respectively.

As a result, a contact distance between the first and second wires W1 and W2 at the crossing point is reduced, so that the winding position of the second wire W2 positioned above the first wire W1 is stabilized. That is, the second wire W2 is positioned right over the first wire W1 at the center of the crossing point (see FIG. 5B), so that a force to displace the second wire W2 in the x-direction does not act; however, the second wire W2 is positioned on the inclined face of the first wire W1 (see FIG. 5D) at a portion slightly separated from the center of the crossing point in the y-direction, so that force P to displace the second wire W2 in the x-direction acts. The force P becomes stronger as the contact distance between the first and second sections S1 and S2 at the crossing point is longer (as the angle formed by the first and second sections S1 and S2 is smaller). In the present embodiment, the first and second sections S1 and S2 are separated from each other on the first and second edges E1 and E2, so that the contact distance therebetween is small to reduce the force P. This suppresses displacement of the second wire W2 near the crossing point.

Further, the second wire W2 is more difficult in terms of position control during winding work than the first wire W1. Particularly, the larger the shift amount per unit wire length in the x-direction, the larger the displacement to be caused during winding work is likely to be. However, in the present embodiment, the shift amount of the second wire W2 per unit wire length in the x-direction is reduced in the third winding area A3. Thus, also in this respect, the displacement of the winding position can be reduced. As a result, according to the present embodiment, a common mode filter having less variations in characteristics can be provided.

Second Embodiment

Figure 6:
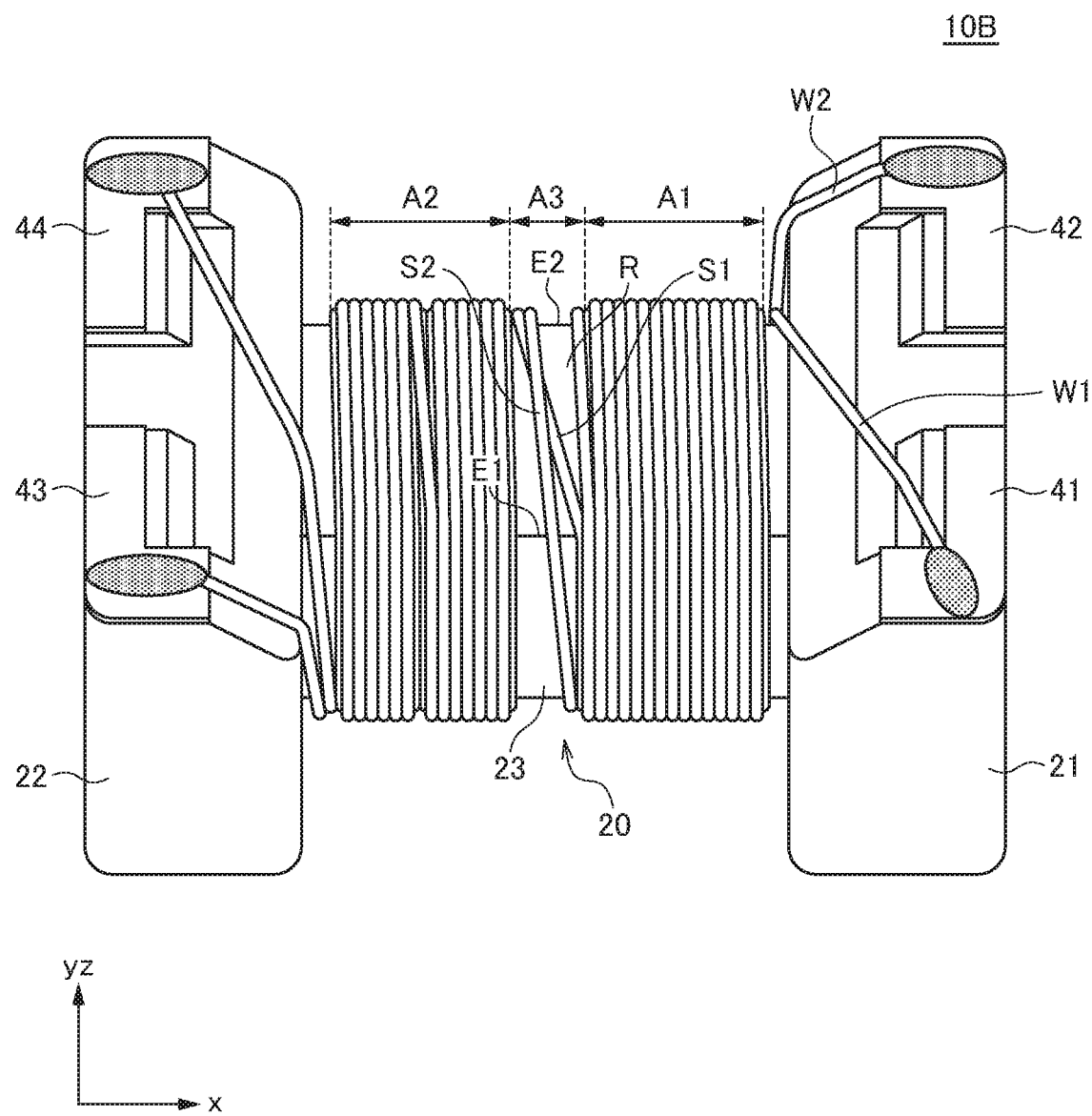
FIG. 6 is a schematic perspective view illustrating the outer appearance of a common mode filter according to a second embodiment of the present invention.

FIG. 6 is a schematic perspective view illustrating the outer appearance of a common mode filter 10B according to the second embodiment of the present invention.

As illustrated in FIG. 6, the common mode filter 10B according to the present embodiment differs from the common mode filter 10A according to the first embodiment in the layout of the second wire W2. Other configurations are the same as those of the common mode filter 10A according to the first embodiment, so the same reference numerals are given to the same elements, and overlapping description will be omitted.

Figure 7:
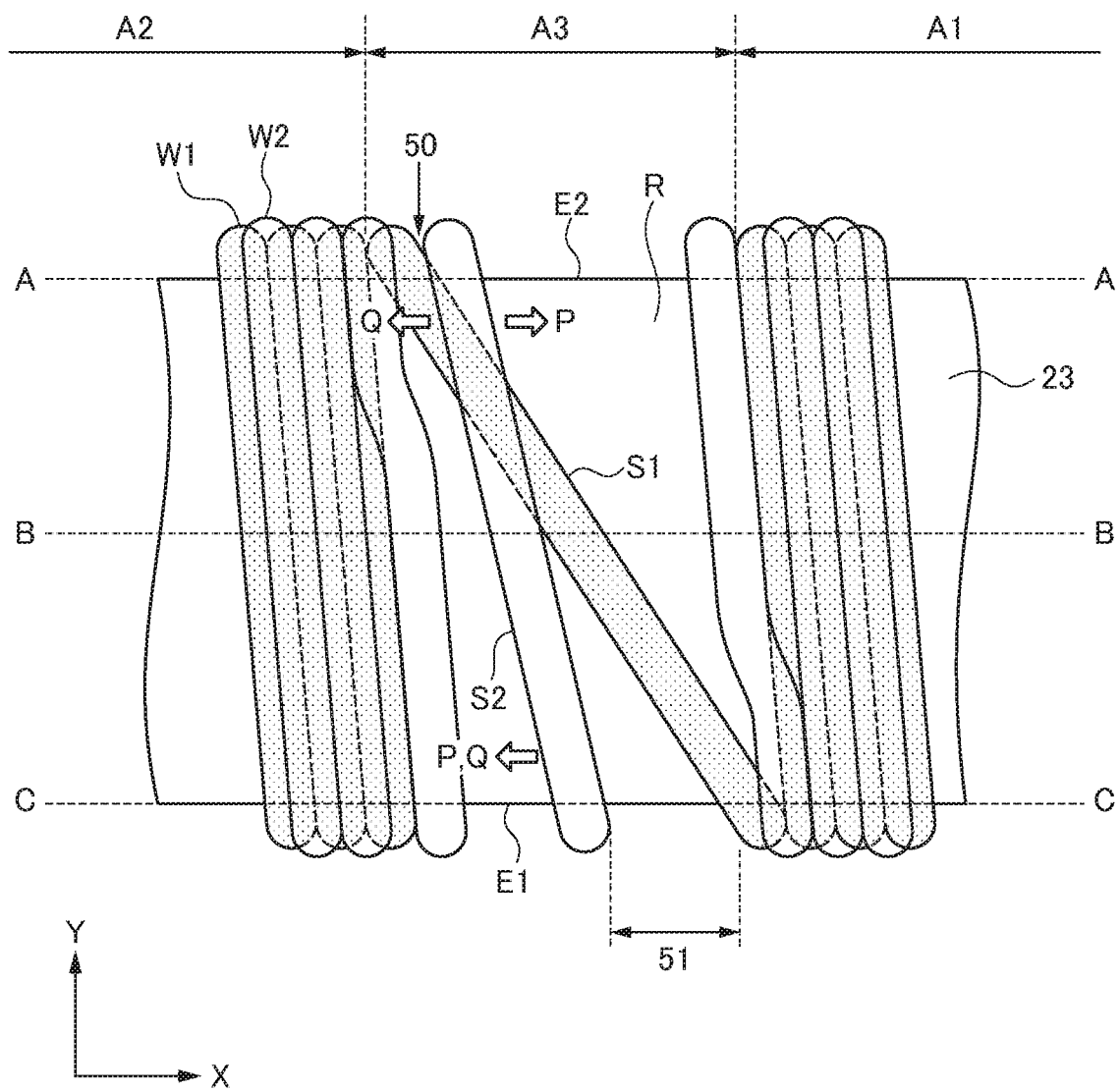
FIG. 7 is a schematic view for explaining more in detail the winding layout of the first and second wires in the second embodiment.

FIG. 7 is a schematic view for explaining more in detail the winding layout of the first and second wires W1 and W2. FIG. 8A is a schematic cross-sectional view taken along line A-A (second edge E2) shown in FIG. 7, FIG. 8B is a schematic cross-sectional view taken along line B-B shown in FIG. 7, and FIG. 8C is a schematic cross-sectional view taken along line C-C (first edge E1) shown in FIG. 7. Numbers are added to the respective turns of the first and second wires W1 and W2 in FIGS. 11A to 11C (and the following figures).

In the present embodiment, as denoted by the double headed arrow 51, in the third winding area A3, the first and second wires W1 and W2 are separated from each other on the first edge E1 and, as denoted by the arrow 50, the first and second wires W1 and W2 contact each other on the second edge E2. Accordingly, the separation distance between the first and second wires W1 and W2 on the first edge E1 is larger than that in the first embodiment, and the second wire W2 on the first edge E1 is positioned at substantially the x-direction center in the third winding area A3.

The winding layout according to the present embodiment is particularly effective when the second wire W2 is wound from the first edge E1 side toward the second edge E2 side. The reason for this is as follows.

When the second wire W2 is wound from the first edge E1 side to the second edge E2 side, a force (force in the shift direction) denoted by blanked arrow Q is always applied to the second wire W2 during winding work. On the other hand, force P to displace the second wire W2 near the crossing point is applied in the same direction as the force Q on the first edge E1 side and in the direction opposite to the force Q on the second edge E2 side. That is, the force P and force Q cancel each other on the second edge E2 side. On the other hand, the force P and the force Q are added to each other on the first edge E1 side, so that the second wire W2 is displaced more easily on the first edge E1 side.

However, in the present embodiment, the crossing point between the first and second wires W1 and W2 is offset to the second edge E2 side, so that the force P on the first edge E1 side is significantly reduced, making the displacement of second wire W2 on the first edge E1 side less likely to occur. On the other hand, on the second edge E2 side, the force P and the force Q cancel each other as described above, and a distance between the crossing point and the second edge E2 is small, so that the position of the second wire W2 is held by the second edge E2. By such a mechanism, the second wire W2 can be effectively prevented from being displaced.

As described above, in the present embodiment, the winding layout taking the winding direction of the second wire W2 into consideration is adopted, allowing increased stability in the second wire W2 to be obtained.

<Modifications>

FIGS. 9A to 9C are views for explaining the first modification and correspond respectively to FIGS. 8A to 8C.

In the example of FIGS. 9A to 9C, the first winding block B1 is formed in the first winding area A1, while in the second winding area A2, the second and fourth winding blocks B2 and B4 are formed. In the present example, the fourth winding block B4 is disposed between the first and second winding blocks B1 and B2. The fourth winding block B4 is a winding block in which the same turns of the first and second wires W1 and W2 are positioned with different turns thereof interposed therebetween. For example, in the fourth winding block B4, the turn "2" of the first wire W1 and the turn "4" of the second wire W2 are interposed between the turn "3" of the first wire W1 and the turn "3" of the second wire W2. Such a layout can be obtained by disposing the turn "1" of the second wire W2 on the valley line formed by the turn "0" of the first wire W1 and the turn "0" of the second wire W2, as illustrated in FIG. 9A.

In the present example, although symmetry between differential signals is deteriorated, it is possible to make larger a difference in high-frequency characteristics depending on the mounting direction with respect to amounting substrate than in the common mode filter 10B according to the second embodiment.

FIGS. 10A to 10C are views for explaining a second modification and correspond respectively to FIGS. 8A to 8C.

In the example of FIGS. 10A to 10C, the first winding block B1 is formed in the first winding area A1, while in the second winding area A2, the third and fourth winding blocks B3 and B4 are formed. In the present example, the fourth winding block B4 is disposed between the first and third winding blocks B1 and B3. As described above, the third winding block B3 is a block in which the same turns of the first and second wires W1 and W2 are mutually adjacent like the second winding block B2 and, in the third winding block B3, the first wire W1 of the pair of wires (first and second wires W1 and W2) constituting the same turn is positioned on the crossing side. The fourth winding block B4 is a winding block in which the same turns of the first and second wires W1 and W2 are positioned with different turns thereof interposed therebetween.

As illustrated in FIGS. 10A to 10C, a space corresponding to two pitches is provided between the second wire W2 constituting the third winding block B3 and the second wire W2 constituting the fourth winding block B4. To realize such a winding layout, the second wire W2 is wound with two pitches skipped on the way from the fourth winding block B4 to the third winding block B3 during winding work.

In the present modification, a common mode filter having two types of high-frequency characteristics can be provided as in the first modification. As exemplified in the present modification, the skip amount (one pitch) of the second wire W2 in the first winding area A1 and the skip amount (two pitches) of the second wire W2 in the second winding area A2 may differ from each other.

It is apparent that the present invention is not limited to the above embodiments, but may be modified and changed without departing from the scope and spirit of the invention.

What is claimed is:

1. A common mode filter comprising:
   a winding core part including a first winding area positioned at one end side in an axial direction, a second winding area positioned at other end side in the axial direction, and a third winding area positioned between the first and second winding areas; and
   first and second wires wound in a same direction around the winding core part,
   wherein the first and second wires cross each other in the third winding area,
   wherein the first wire is aligned and wound in the first and second winding areas, and the second wire is aligned and wound on the first wire in the first and second winding areas, whereby a plurality of winding blocks in each of which the second wire is aligned and wound on the aligned and wound first wire are formed,
   wherein the plurality of winding blocks include a first winding block positioned in the first winding area and second and third winding blocks positioned in the second winding area, and
   wherein the second wire constituting the second winding block and the second wire constituting the third winding block are separated from each other, and
   wherein same turns of the first and second wires in each of the first, second, and third winding blocks are mutually adjacent.

2. The common mode filter as claimed in claim 1, wherein a number of turns of the second wire constituting the first winding block is larger than a number of turns of the second wire constituting the second winding block and a number of turns of the second wire constituting the third winding block.

3. The common mode filter as claimed in claim 1,
   wherein same turns of the first and second wires in the second winding block are mutually adjacent, and
   wherein same turns of the first and second wires in the third winding block are positioned with different turns thereof interposed.

4. The common mode filter as claimed in claim 3, wherein the third winding block is positioned between the first and second winding blocks.

5. The common mode filter as claimed in claim 1, wherein the first and second wires are at least partially separated from each other in the third winding area.

6. The common mode filter as claimed in claim 5,
   wherein the third winding area has first and second edges extending in the axial direction and a surface area positioned between the first and second edges,
   wherein the first wire includes a first section positioned on the surface area,
   wherein the second wire includes a second section positioned on the surface area, and
   wherein the first section of the first wire and the second section of the second wire cross each other on the surface area and are separated from each other at least on one of the first and second edges.

7. The common mode filter as claimed in claim 6, wherein the first section of the first wire and the second section of the second wire are separated from each other on the first edge and contact each other on the second edge.

8. A common mode filter comprising:
   a winding core part including first and second winding areas and a third winding area positioned between the first and second winding areas; and
   first and second wires wound around the first and second winding areas respectively in a plurality of turns,
   wherein the first and second wires cross each other on the third winding area,
   wherein the second wire is wound along valley lines formed by adjacent turns of the first wire on the second winding area,
   wherein the first wire on the second winding area includes first, second, third, and fourth turns,
   wherein the valley lines include:
      a first valley section formed by the first and second turns of the first wire;
      a second valley section formed by the second and third turns of the first wire; and
      a third valley section formed by the third and fourth turns of the first wire, and
   wherein the second wire is wound on the first and third valley sections without being wound on the second valley section.

9. The common mode filter as claimed in claim 8,
   wherein the second wire on the second winding area includes a first turn wound on the first valley section and a second turn wound on the third valley section,
   wherein the second turn of the first wire and the first turn of the second wire are same turn counted from a crossing point on the third winding area, and
   wherein the third turn of the first wire and the second turn of the second wire are same turn counted from the crossing point.

10. The common mode filter as claimed in claim 8,
    wherein the second wire on the second winding area includes a first turn wound on the first valley section and a second turn wound on the third valley section,
    wherein the third turn of the first wire and the first turn of the second wire are same turn counted from a crossing point on the third winding area, and
    wherein the fourth turn of the first wire and the second turn of the second wire are same turn counted from the crossing point.

11. A common mode filter comprising:
    a winding core part including first and second winding areas and a third winding area positioned between the first and second winding areas; and
    first and second wires wound around the first and second winding areas respectively in a plurality of turns,
    wherein the first and second wires cross each other on the third winding area,
    wherein the second wire is wound along valley lines formed by adjacent turns of the first wire on the second winding area,
    wherein the first wire on the second winding area includes first, second, third, fourth, and fifth turns,
    wherein the valley lines include:
       a first valley section formed by the first and second turns of the first wire;
       a second valley section formed by the second and third turns of the first wire;
       a third valley section formed by the third and fourth turns of the first wire,
       a fourth valley section formed by the fourth and fifth turns of the first wire, and
    wherein the second wire is wound on the first and fourth valley sections without being wound on the second and third valley sections.

12. The common mode filter as claimed in claim 11,
    wherein the second wire on the second winding area includes a first turn wound on the first valley section and a second turn wound on the fourth valley section, wherein the third turn of the first wire and the first turn of the second wire are same turn counted from a crossing point on the third winding area, and wherein the fourth turn of the first wire and the second turn of the second wire are same turn counted from the crossing point.

\* \* \* \* \*

UNITED STATES PATENT AND TRADEMARK OFFICE
CERTIFICATE OF CORRECTION

PATENT NO. : 10,784,038 B2
APPLICATION NO. : 15/876575
DATED : September 22, 2020
INVENTOR(S) : Yuma Komaya, Miki Kusakabe and Tomokazu Tsuchiya It is certified that error appears in the above-identified patent and that said Letters Patent is hereby corrected as shown below:

On the Title Page

Column 1, insert:
--Foreign Application Priority Data
Jan. 23, 2017[JP]          2017-009411--

Signed and Sealed this
Sixth Day of April, 2021

Drew Hirshfeld
*Performing the Functions and Duties of the
Under Secretary of Commerce for Intellectual Property and
Director of the United States Patent and Trademark Office*